Patented June 20, 1944

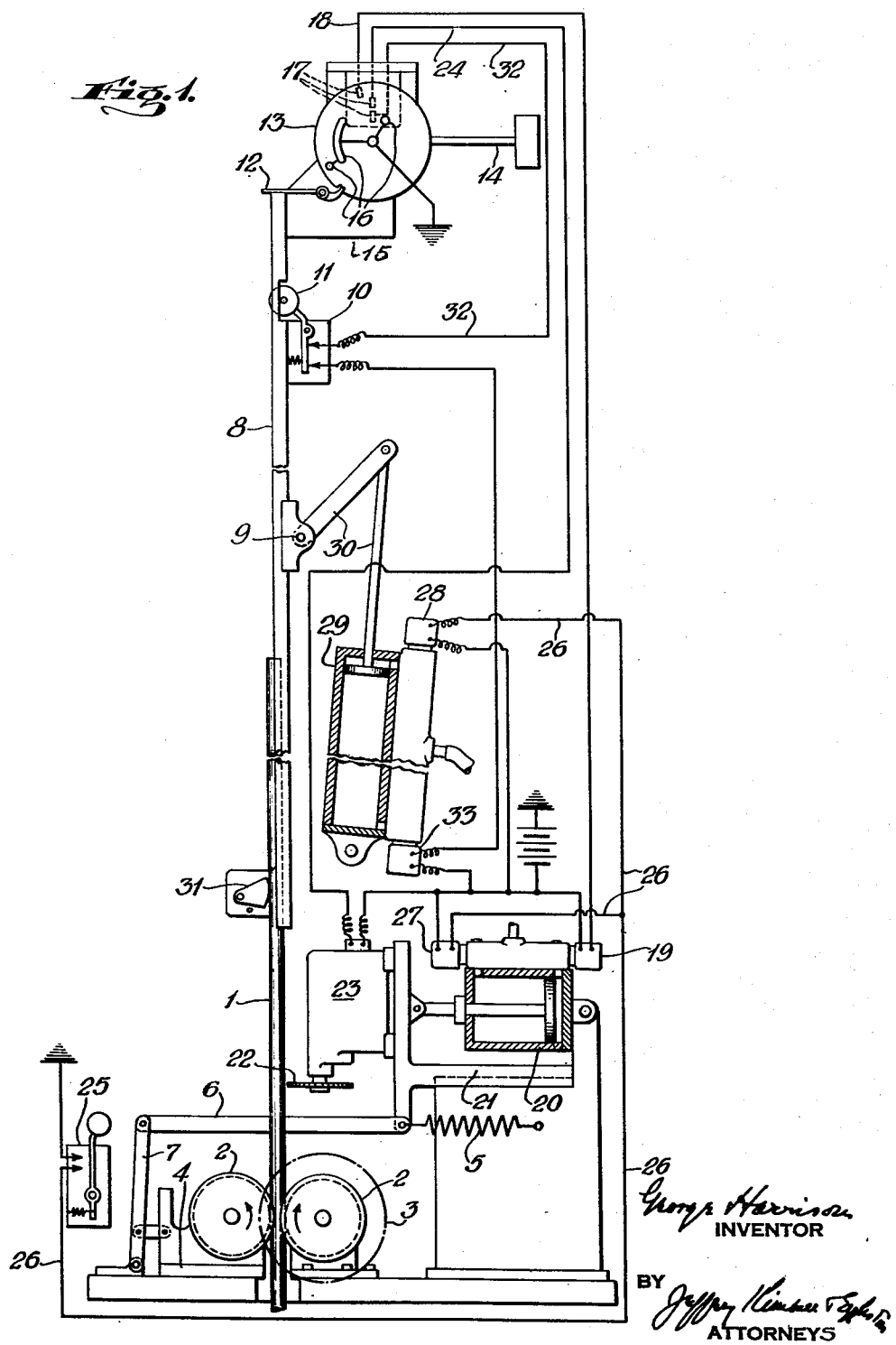

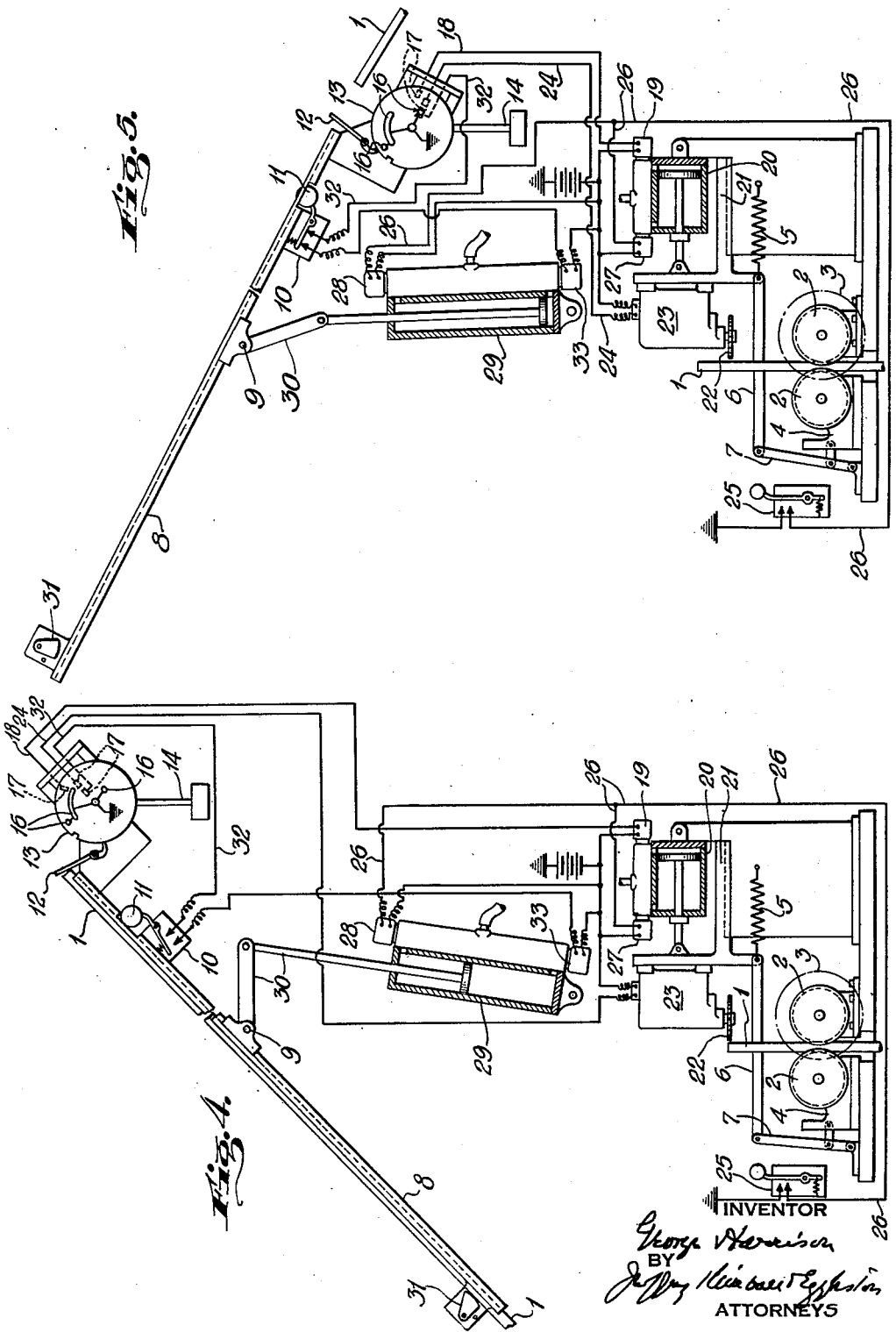

2,351,962

UNITED STATES PATENT OFFICE 2,351,962

ROD-HANDLING MACHINERY

George Harrison, Batavia, N. Y., assignor to Doehler Die Casting Company, New York, N. Y., a corporation of New York Application March 19, 1942, Serial No. 435,357

12 Claims. (Cl. 29—69)

The specific object of this invention is the handling of freshly cast rod as delivered from continuous rod-casting machines, for removing it from the machine and transferring it in predetermined unit length to a desired place of deposit, but the principles involved are applicable to analogous machines, all of which are intended to be included within the scope of this patent. The term rod as herein used includes tubes and other cross-sectional shapes.

The drawings herein represent in diagram the form of the invention now preferred and as applied to a continuous rod-casting machine of the kind which delivers its rod upwardly and which may be understood to be such a machine as is shown in prior application, Serial No. 398,540, of which this present application is a continuation to the extent that it contains similar disclosure.

Figure 3:
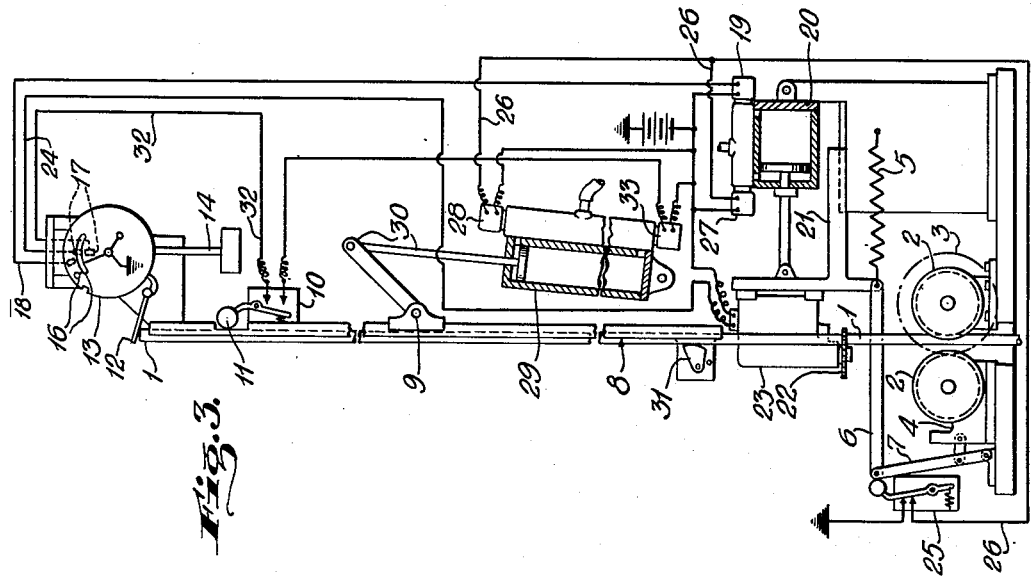
Figure 2:
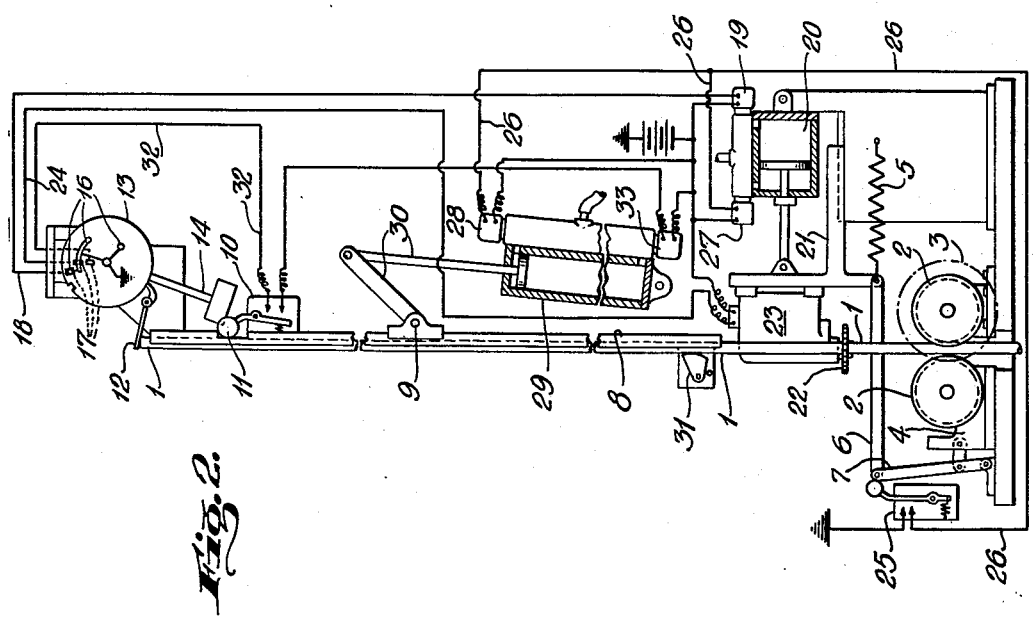

In the drawings, Fig. 1 represents the relation of the parts in the normal rod-receiving position; Fig. 2 the same substantially at the start of the cutting-off operation; Fig. 3 the finish of that operation; Fig. 4 a midway position; and Fig. 5 the delivery position.

Referring first to Fig. 1: The freshly cast rod 1 is delivered upwardly by a pair of grooved rolls 2, forming part of the casting mechanism, and such delivery may be understood to be either continuous or intermittent so far as this invention is concerned, the drive of the rolls being indicated by the dotted pitch circle 3 in Fig. 1. One of these rolls is mounted on a movable carriage 4 and normally pressed toward the other with force sufficient to give them the requisite grip on the rod for withdrawing it from the casting die. In the present case the pressure is furnished by a spring 5 acting on the roll carriage through a link 6 and a lever 7, the action of which is clear in the drawings.

The rod ascends into a trough-shaped receiving channel, 8, herein termed a cradle, supported to turn on an axis 9, which, in the present case is transverse to the cradle and horizontal, so that this cradle swings in a vertical arc. Other directions of cradle movement are also contemplated. The function of the cradle is to transfer the rod to a conveyor belt or some other place of deposit adjacent the casting machine and for this purpose the elevation and inclination of the axis 9 and the length of the cradle itself are corelated accordingly and so that the rod is accurately conducted to such place of deposit sliding out of the cradle by gravity. In the present case the cradle swings more than 90° from its normal vertical position to an inverted position, as in Fig. 5 and the rod slides out of the end of the cradle that is normally uppermost, but the degree of arc traversed depends on the location of the place of deposit as will now be understood.

As the rod rises in the cradle it encounters a feeler 11, which is a roller on the end of the actuating arm of an electric switch 10, and opens this switch but such opening produces no immediate effect. This switch is mounted on the cradle with its feeler arm protruding through a window in the bottom thereof and is held in open condition so long as the rod remains in the cradle, being closed by its departure therefrom.

The continued ascent of the rod in the cradle next operates the trigger element 12 of a master control device which is most simply made in the form of an electric switch 13 and the function of which is to initiate and control the cycle of the operating system. For diagrammatic purposes this switch is shown as a rotary disc journalled in a bracket 15 and provided with a weighted arm or pendulum 14. The several contact plates 16 carried on the disc are electrically grounded, and adapted for selected contact at different points in the cycle with complementary contacts 17 fixed on the bracket being thereby adapted to complete three different circuits presently described. The switch is shown as carried on the upper end of the cradle 8 and its movable element or disc 13 is normally maintained in a set condition, with the pendulum extending horizontally, by the trigger element 12 engaging a notch in the edge of the disc 13. In this position all of the circuits referred to are open.

When the rod trips the trigger element the effect of the pendulum is to cause the switch disc to turn and its grounded contacts to take the position of Fig. 2, which is a position only momentarily held, due to the momentum of the weight carrying it past vertical. This action closes two circuits. One of them, marked 18, includes the solenoid element 19 of the electrically operated valve mechanism of a fluid pressure motor or cylinder 20, the function of which is to advance and retract the cut-off mechanism, which latter comprises a saw carriage 21, a rotary saw 22 and its electric driving motor 23. The effect of energizing the solenoid 19 is to cause this carriage to advance toward the rod. The other circuit, marked 24, includes the saw-driving motor 23 so that the saw is thus active on the advancing stroke.

Having served to admit pressure to the cut-off cylinder 20 and thus advance the saw carriage, circuit 18 is opened as the pendulum 14 assumes its vertical position, shown in Fig. 3, but the circuit 24 continues closed due to the shape of the contact 16 as shown in the diagram and the saw is thus continued active. The initial movement of the saw carriage 21 acts through link 6 on the lever 7 to relieve the spring pressure by which the casting-machine rolls 2 normally grip the rod. This stops the casting operation so that by the time the saw encounters the rod the latter is stationary. When the saw has passed through the rod the continued swing of lever 7 engages and closes the return switch 25 against the pull of its spring which normally holds it in open position.

The circuit 26 thus established includes the solenoid 27 of the valve mechanism of the cut-off cylinder 20 and also another solenoid 28 in the valve box of the cradle-motor cylinder 29. The action of solenoid 27 reverses the valve mechanism of the cut-off cylinder so as to start the saw carriage returning to its normal position, or to allow the spring 5 to do it, thus restoring the pressure on rolls 2 and starting the rod-casting machine again in action to resume delivery.

The action of the solenoid 28 admits pressure to the top of cylinder 29 to swing the cradle 8 by its connections 30 therewith toward its delivery position as indicated in Fig. 4. The severed rod during this movement is held from sliding backwards out of the cradle by a friction dog 31 or equivalent means. The pendulum 14 of the master switch retains its vertical position while the bracket carrying the fixed contacts 17 moves with relation to it, and the first effect of this relative movement, as will be seen from the diagram is to open circuit 24 to stop the saw, now no longer needed.

By the time the cradle reaches its inverted delivery position indicated in Fig. 5 the master switch will have closed a gap in the circuit 32, the third of its three circuits, which circuit includes the solenoid 33 of the cradle motor valve box and the feeler switch 10 on the cradle. This latter switch until now held open by the presence of the rod in the cradle, closes when the rod slides out of the cradle as indicated in Fig. 5, and thereby causes admission of pressure to the lower end of the cradle motor cylinder 29 causing the cradle to make its return journey back to its original rod-receiving position indicated in Fig. 1.

In performing this movement the pendulum retains its vertical position until the trigger 12 again engages the notch of the disc 13 after which the continued return movement carries it to the horizontal position of Fig. 1 thus resetting the master control device for the next cycle.

It may be noted that the location of the trigger element with respect to the cut-off device determines the length of the rod cut-off and that it can be located at any point on the cradle desired, adjustable if preferred. The master switch is most conveniently mounted on the cradle adjacent to the trigger, being connected in the electrical system by flexible leads which accommodate the cradle movement. However for the functioning of this control device it is only important that it be connected to and tip with or in unison with the cradle, whether or not mounted as shown, so as to close the circuits successively in the performance of the cycle. Its pendulum represents a convenient and extremely simple means for turning the rotary switch disc on release as well as for resetting it, and will be recognized as taking the place of a spring and relatively fixed members or cam tracks which would be its more complicated equivalent.

It will be understood of course that the diagrams do not attempt to illustrate the mechanical detail of any of the parts or valve mechanism, all of which can be organized in known manner for performing their assigned functions, it being noted that the cylinders are essentially representations of the preferred form of motor devices for imparting the movements required.

I claim:

1. Apparatus for handling rod from a continuous rod-casting machine comprising a cradle in which the rod advances as it is cast, a pivotal support for the cradle on which it tips to discharge a severed rod, means successively operating to sever the rod and tip and restore the cradle to rod-receiving position, and a device for initiating said successive operations, including a member connected to and tipping with the cradle and a cooperating second member which is relatively fixed with respect to the tipping movement of the other, whereby said device functions according to change of cradle inclination.

2. Apparatus for handling rod from an upwardly-delivering, continuous rod-casting machine comprising a normally upright cradle in which the rod rises as it is cast, a pivotal support for the cradle having its axis transverse to the length of the cradle and on which the cradle tips to an inclination at which a rod will slide longitudinally therefrom by gravity, means successively operating to sever the rod, and tip and restore the cradle to upright position, a trigger device located for actuation by the rise of the rod in the cradle, and master mechanism for initiating said operations, including a member connected to and tipping with the cradle and a cooperating second member which is relatively fixed with respect to the tipping movement of the other, whereby said mechanism functions according to change of cradle inclination.

3. Apparatus for handling rod from a continuous rod-casting machine comprising a cradle in which the rod advances as it is cast, a pivotal support for the cradle on which the cradle tips to discharge, means successively operating to sever the rod, and tip and restore the cradle, a trigger located for actuation by the advance of the rod in the cradle, and mechanism released by the trigger for initiating said operations, including a member connected to and tipping with the cradle, and a cooperating pendulum-controlled second member pivotally related to the other, whereby said mechanism functions according to cradle inclination.

4. Apparatus for handling rod from a continuous rod-casting machine, comprising a cradle in which the rod advances as it is cast, a pivotal support for the cradle on which it tips to discharge, electrically controlled means for successively severing the rod and tipping and restoring the cradle, and a master-switch for initiating said operations including a contact-carrying member connected to and tipping with the cradle and cooperating contact-making member which is relatively fixed with respect to the other, whereby said switch functions according to change of cradle inclination.

5. Apparatus for handling rod from a continuous rod-casting machine, comprising a cradle in which the rod advances as it is cast, a pivotal support for the cradle on which the cradle tips to discharge, means successively operating to sever the rod, and tip and restore the cradle, a trigger located on and tipping with the cradle for actuation by the advance of the rod therein and mechanism for initiating said operations controlled by said trigger, including a member connected to and tipping with the cradle and a cooperating pendulum-controlled second member pivotally related to the other, whereby said mechanism functions according to cradle inclination.

6. Apparatus for handling rod from a continuous rod-casting machine, comprising a cradle in which the rod advances as it is cast, a pivotal support for the cradle on which it tips to discharge, electrically controlled means for successively severing the rod and tipping and restoring the cradle, a master-switch for initiating said operations, means controlled by the advance of the rod to actuate said switch, including a contact carrying member connected to and tipping with the cradle and a cooperating contact-making member pivotally mounted with respect to the other and a pendulum weight on the latter member whereby said switch functions according to change of cradle inclination.

7. Apparatus for handling rod from a continuous rod-casting machine, comprising a cradle in which the rod advances, a pivotal support for the cradle on which it tips to discharge, electrically controlled means for successively severing the rod and tipping and restoring the cradle, a master-switch for governing these operations including a contact-carrying member connected to and tipping with the cradle and a cooperating contact-making member pivotally mounted with respect to the other, whereby said switch functions according to change of cradle inclination, means for imposing a turning force on said contact-making member and a trigger element controlled by the advancing rod for releasing said member to start said operations.

8. Apparatus for handling rod from a continuous rod-casting machine, comprising a cradle, a pivotal support therefor on which it tips to discharge a rod, electrically controlled means for successively severing the rod and tipping and restoring the cradle, a master-switch governing said operations including a contact-carrying member connected to and tipping with the cradle and a cooperating contact-making member pivotally mounted with respect to the other whereby said switch functions according to change of cradle inclination, a pendulum on the latter member and a trigger element, rod controlled, normally holding said member under the pressure exerted by the pendulum and adapted to release said member to start the sequence of said operations.

9. Rod-handling apparatus for continuous rod-casting machines, comprising a cradle, a pivotal support for it on which it tips to discharge, electrically controlled means for successively severing the rod and tipping and restoring the cradle, and a master-switch governing said operations including a pivoted contact-making member carried by or moving with the cradle, a pendulum weight on said member adapted to rotate the same, relatively, as the cradle tips, and a trigger on the cradle to be actuated by the advancing rod and normally locking the pendulum rotation of said member.

10. Rod-handling apparatus for continuous rod-casting machines, comprising in combination, a cradle, a pivotal support for the cradle on which it tips to discharge, electrically-controlled means for severing the rod and tipping and restoring the cradle including a pendulum-controlled rotary contact-making member connected to the cradle to tip therewith and a rod-actuated trigger for said member, organized to hold it against pendulum-actuation and adapted to release it and a contact located to be engaged by said member on the overswing thereof when released.

11. Apparatus for handling rod from a continuous rod-delivering machine comprising a cradle in which the rod advances as it is delivered, a support for the cradle on which it tips to discharge a severed rod, means for severing the rod including a carriage and motor to advance it toward the rod, a motor for tipping and restoring the cradle to rod-receiving position, and a device for initiating successive operation of said motors including a member connected to and tipping with the cradle and a cooperating second member which is relatively fixed with respect to the tipping motion of the other, whereby said device functions according to change of cradle inclination.

12. Apparatus for handling rod from a continuous rod-delivering machine comprising a cradle in which the rod advances as it is delivered, a support for the cradle on which it tips to discharge a severed rod, means for severing the rod including a saw and motor to drive it and a saw-carriage and motor to advance it toward the rod, a motor for tipping and restoring the cradle to rod-receiving position, and a device for initiating successive operation of said motors including a member connected to and tipping with the cradle and a cooperating second member which is relatively fixed with respect to the tipping motion of the other, whereby said device functions according to change of cradle inclination.

GEORGE HARRISON.